(12) United States Patent
Honda et al.

(10) Patent No.: US 8,340,817 B2
(45) Date of Patent: Dec. 25, 2012

(54) LEGGED ROBOT AND ITS CONTROL METHOD

(75) Inventors: Daisaku Honda, Kasugai (JP); Keisuke Suga, Nishikamo-gun (JP); Ryosuke Tajima, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1004 days.

(21) Appl. No.: 12/209,422

(22) Filed: Sep. 12, 2008

(65) Prior Publication Data

US 2009/0069940 A1 Mar. 12, 2009

(30) Foreign Application Priority Data

Sep. 12, 2007 (JP) ................................. 2007-237038

(51) Int. Cl.
*G06F 19/00* (2006.01)

(52) U.S. Cl. ........ 700/245; 700/246; 700/251; 700/253; 700/258; 700/260

(58) Field of Classification Search .................. 700/258, 700/245, 246, 251, 253, 260; 318/568.12, 318/568.16; 180/8.5, 8.6
See application file for complete search history.

(56) References Cited

U.S. PATENT DOCUMENTS

| | | | | |
|---|---|---|---|---|
| 6,301,524 B1 * | 10/2001 | Takenaka | ...................... | 700/245 |
| 6,580,969 B1 * | 6/2003 | Ishida et al. | ................... | 700/245 |
| 6,802,382 B2 * | 10/2004 | Hattori et al. | ................... | 180/8.6 |
| 6,876,903 B2 * | 4/2005 | Takenaka | ...................... | 700/245 |
| 6,898,485 B2 * | 5/2005 | Kuroki et al. | ................. | 700/245 |
| 6,961,640 B2 * | 11/2005 | Kuroki et al. | ................. | 700/245 |
| 7,053,577 B2 * | 5/2006 | Nagasaka | ................ | 318/568.12 |
| 7,057,367 B2 * | 6/2006 | Furuta et al. | ............. | 318/568.12 |
| 7,061,200 B2 * | 6/2006 | Iribe | ........................ | 318/568.16 |
| 7,072,740 B2 * | 7/2006 | Iribe et al. | ...................... | 700/245 |
| 7,228,923 B2 * | 6/2007 | Takenaka et al. | .............. | 180/8.6 |
| 7,278,501 B2 * | 10/2007 | Mori et al. | ..................... | 180/8.5 |
| 7,313,463 B2 * | 12/2007 | Herr et al. | ...................... | 700/245 |
| 7,400,939 B2 * | 7/2008 | Nagasaka | ..................... | 700/245 |
| 7,482,775 B2 * | 1/2009 | Zaier | ........................ | 318/568.12 |
| 7,649,331 B2 * | 1/2010 | Hosoda et al. | ........... | 318/568.12 |
| 7,805,218 B2 * | 9/2010 | Nagasaka | ..................... | 700/245 |
| 7,881,824 B2 * | 2/2011 | Nagasaka et al. | ............. | 700/260 |
| 7,942,221 B1 * | 5/2011 | Tilden | ............................ | 180/8.6 |
| 8,060,253 B2 * | 11/2011 | Goswami et al. | ............. | 700/250 |
| 2004/0044440 A1 * | 3/2004 | Takenaka | ...................... | 700/245 |
| 2005/0234593 A1 * | 10/2005 | Goswami et al. | ............. | 700/245 |
| 2007/0016329 A1 * | 1/2007 | Herr et al. | ...................... | 700/250 |
| 2009/0069940 A1 * | 3/2009 | Honda et al. | .................. | 700/258 |
| 2009/0069941 A1 * | 3/2009 | Honda et al. | .................. | 700/258 |
| 2012/0035762 A1 * | 2/2012 | Goswami et al. | ............. | 700/245 |

FOREIGN PATENT DOCUMENTS

| | | |
|---|---|---|
| JP | 2004-167676 A | 6/2004 |
| JP | 2006-212736 A | 8/2006 |

* cited by examiner

*Primary Examiner* — Thomas Black
*Assistant Examiner* — Wae Louie
(74) *Attorney, Agent, or Firm* — Kenyon & Kenyon LLP

(57) ABSTRACT

There is provided a legged robot that performs motion by changing a joint angle, which includes a section of generating a center-of-gravity trajectory of the legged robot based on a trinomial equation obtained by discretizing a ZMP equation and a target ZMP, a section of calculating time-varying data of a target value of the joint angle based on the generated center-of-gravity trajectory, and a section of rotating a joint of the legged robot based on the calculated time-varying data of a target value of the joint angle, wherein the ZMP equation involves an angular momentum according to a center-of-gravity velocity.

6 Claims, 5 Drawing Sheets

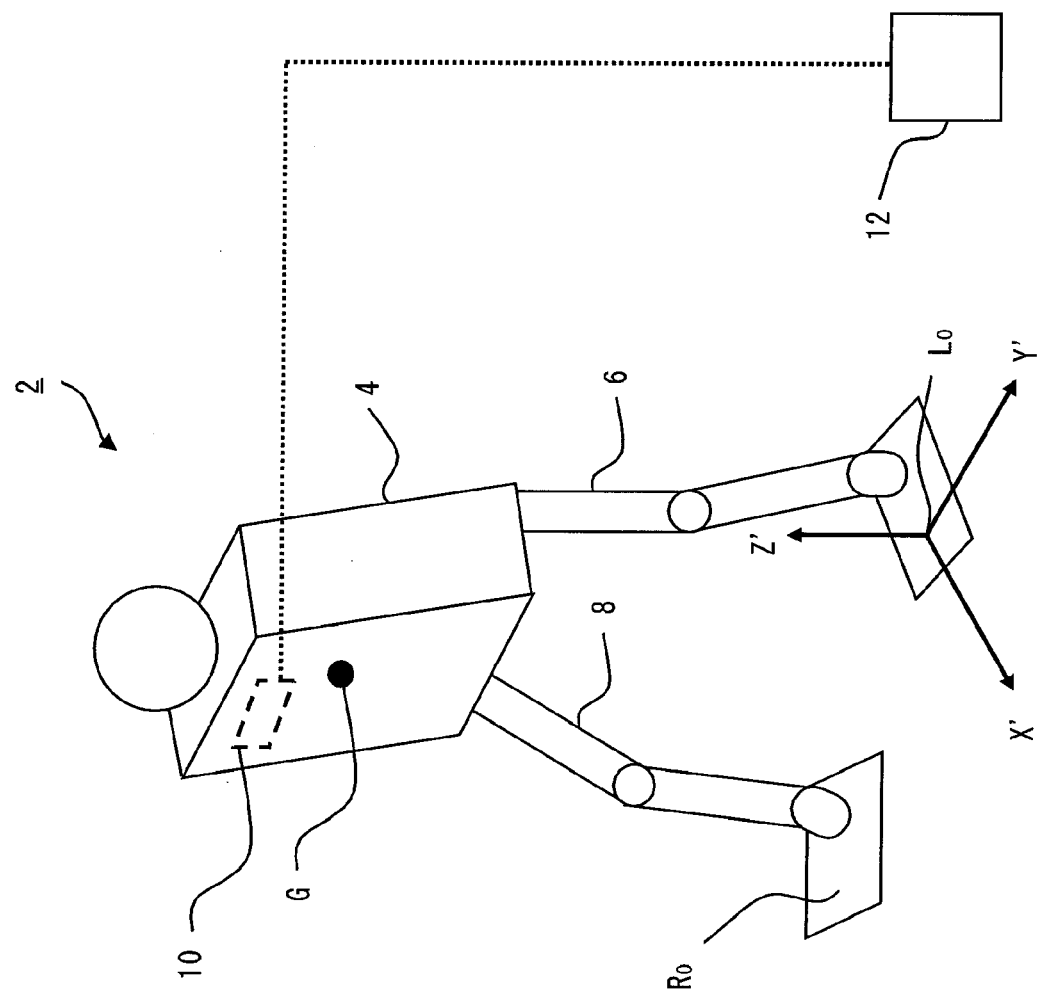
Fig. 1
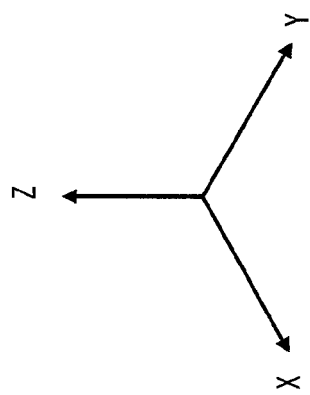

LEGGED ROBOT AND ITS CONTROL METHOD

BACKGROUND OF THE INVENTION

1. Field of the Invention

The present invention relates to a legged robot and its control method.

2. Description of Related Art

Various techniques have been proposed for generating a walking trajectory of a legged walking robot. As one technique of generating a walking trajectory, a technique of generating the trajectory of the center of gravity position of a robot is known (e.g. Japanese Unexamined Patent Application Publication Nos. 2004-167676 and 2006-212736). Japanese Unexamined Patent Application Publication No. 2004-167676 discloses a technique of calculating the trajectory of the center of gravity in which a ZMP (zero moment point) that is calculated by a ZMP equation coincides with a target ZMP. In this description, the term "trajectory" refers to data that describes a change in position over time.

Generating the trajectory of the center of gravity of a robot generally requires the trajectory of the angular momentum of rotation about the center of gravity of the robot. However, the related arts focus on obtaining the trajectory of the center of gravity of a robot and take no consideration about a method of setting an appropriate angular momentum while satisfying condition to prevent the falling down of a robot. For example, the related arts assume the angular momentum of a robot to be 0 or treat the angular momentum as a disturbance. If the angular momentum is assumed to be 0, the trajectory is generated on the assumption that the angular momentum is conserved.

Because the falling down of a robot is partly caused by the time rate of change of the angular momentum, generating the trajectory of the center of gravity assuming that the angular momentum in motion is 0 actually results in an unnatural trajectory in which the upper body of a robot rotates.

In the case where a biped locomotion robot performs on-the-spot stepping motion by setting the angular momentum to 0, for example, if the center of gravity shifts to the left, the upper body rotates to the right as shown in FIG. 5B because the angular momentum of 0 is conserved. Specifically, because the robot tries to maintain the angular momentum to be 0 against the movement of the upper body, the upper body rotates so largely as to be off-balance. Likewise, in the case of running motion, the upper body of the robot rotates to the back by every one-step forward, resulting in the backward-bent posture.

Such motion is not only unnatural in appearance but also generates a large torque on a hip joint or the like of the robot, which causes an excessive load on the robot. Further, in the case where human perform the stepping motion, they can implement the motion with the posture maintained without rotating the upper body. Thus, in order for the robot to implement the motion in the same natural posture, it is necessary to set the angular momentum to an appropriate value rather than setting it to 0.

As described above, according to the related arts that treat the angular momentum as 0, the upper body of the robot behaves in an unnatural way.

SUMMARY OF THE INVENTION

In light of the foregoing, it is desirable to provide a legged robot and its control method capable of generating a trajectory that allows the upper body of the legged robot to behave in a natural way.

According to an embodiment of the present invention, there is provided a legged robot that performs motion by changing a joint angle, which includes a section of generating a center-of-gravity trajectory of the legged robot based on a trinomial equation obtained by discretizing a ZMP equation and a target ZMP, a section of calculating time-varying data of a target value of the joint angle based on the generated center-of-gravity trajectory, and a section of rotating a joint of the legged robot based on the calculated time-varying data of a target value of the joint angle, wherein the ZMP equation involves an angular momentum according to a center-of-gravity velocity of the legged robot.

Because the angular momentum is set to a value according to the shift velocity of the center of gravity, rather than to 0, in this structure, if the center of gravity shifts to the left, for example, the upper body also rotates to the left according to the shift of the center of gravity. This prevents the motion of the robot based on the generated trajectory from being unnatural. In this description, an equation that calculates a ZMP from three time-position coordinates discretized in unit time is referred to as the "trinomial equation obtained by discretizing a ZMP equation". The use of the trinomial equation enables calculation of the trajectory of the center of gravity which realizes the ZMP that coincides with a target ZMP.

The angular momentum may be specified using a mass of the legged robot, a proportionality constant h related to the angular momentum and the center-of-gravity velocity, and the proportionality constant h may be calculated based on a change in posture of the legged robot. By specifying the angular momentum using a term that is proportional to the center-of-gravity velocity and calculating the proportionality constant according to a change in posture in actual motion of the robot, it is possible to easily calculate the proportionality constant that ensures more natural motion for a various kinds of robots having different structures.

Further, the section of generating a center-of-gravity trajectory may calculate the center-of-gravity trajectory by solving simultaneous equations established among a matrix containing a coefficient calculated based on a vertical trajectory of a center of gravity and the angular momentum, a column of center-of-gravity trajectory and a column of target ZMP.

Furthermore, the matrix may be a matrix containing the coefficient calculated based on the vertical trajectory and the angular momentum so that an equation related to a first element in the column of target ZMP involves a last element in the column of center-of-gravity trajectory, and an equation related to a last element in the column of target ZMP involves a first element in the column of center-of-gravity trajectory. By configuring the matrix so as to satisfy condition for performing periodic motion, it is possible to uniquely determine a solution.

Alternatively, the section of generating a center-of-gravity trajectory may calculate the center-of-gravity trajectory by solving simultaneous equations established among a tridiagonal matrix containing a coefficient calculated based on a vertical trajectory of a center of the gravity and the angular momentum, a column of center-of-gravity trajectory, and a column of distance calculated from a target ZMP and a horizontal center-of-gravity velocity at start and end of motion. In this manner, the horizontal center-of-gravity velocity at start and end of motion may be employed as boundary condition. Further, for the simultaneous equations that are expressed using the tridiagonal matrix, a technique of obtaining a solution at high speed with a small calculation load has been developed. It is thereby possible to calculate the center-of-gravity trajectory at high speed with a small calculation load.

According to another embodiment of the present invention, there is provided a control method of a legged robot that performs motion by changing a joint angle, which includes generating a center-of-gravity trajectory of the legged robot based on a trinomial equation obtained by discretizing a ZMP equation and a target ZMP, calculating time-varying data of a target value of the joint angle based on the generated center-of-gravity trajectory, and rotating a joint of the legged robot based on the calculated time-varying data of a target value of the joint angle, wherein the ZMP equation involves an angular momentum according to a center-of-gravity velocity.

Because the angular momentum is set to a value according to the shift velocity of the center of gravity, rather than to 0, if the center of gravity shifts to the left, for example, the upper body also rotates to the left according to the shift of the center of gravity. This prevents the motion of the robot based on the generated trajectory from being unnatural of the legged robot.

According to the embodiments of the present invention described above, it is possible to provide a legged robot and its control method capable of generating a trajectory that allows the upper body of the legged robot to behave in a natural way.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 1 is a view showing the structure of the legged robot according to an embodiment of the present invention;

DETAILED DESCRIPTION OF THE PREFERRED EMBODIMENTS

First Embodiment

Figure 2:
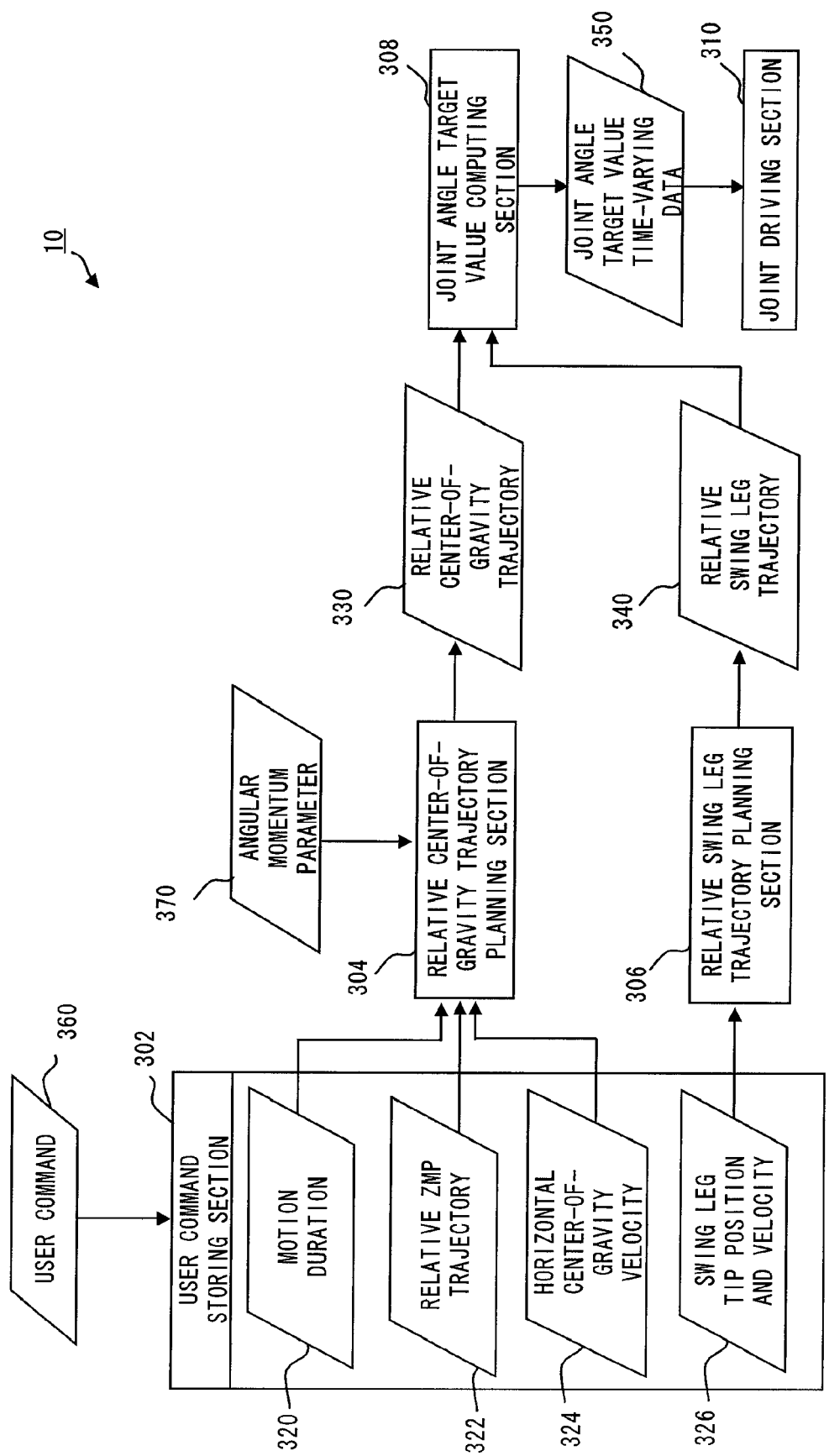
FIG. 2 is a functional block diagram showing the configuration of the control unit of the legged robot according to an embodiment of the present invention.

A legged robot according to a first embodiment of the present invention first generates the trajectory of the center of gravity based on a trinomial equation obtained by discretizing a ZMP equation and a target ZMP. Then, it calculates time-varying data of a target value of a joint angle based on the generated trajectory of the center of gravity and rotates a joint based on the calculated time-varying data of the target value of the joint angle. The legged robot thereby performs motion by changing the joint angle. The ZMP equation involves an angular momentum according to the velocity of the center of gravity.

A trajectory calculation method of a robot according to the first embodiment of the present invention is described hereinafter with reference to the drawings. FIG. 1 is a view showing the outline of the legged robot according to the first embodiment. A robot 2 includes a trunk 4, a left leg link 6, a right leg link 8, a control unit 10 and a controller 12. One end of the left leg link 6 is rotatably coupled to the trunk 4 through a hip joint. The left leg link 6 includes a knee joint and an ankle joint and further includes a foot at the end. One end of the right leg link 8 is rotatably coupled to the trunk 4 through a hip joint. The right leg link 8 includes a knee joint and an ankle joint and further includes a foot at the end. Each joint of the robot 2 has an actuator (not shown), and the actuator drives rotation according to a command from the control unit 10. At the respective centers of the feet of the left leg link 6 and the right leg link 8, reference points L0 and R0 are placed, respectively. The reference points L0 and R0 are points that are used as the reference when generating the motion pattern of the robot 2. In FIG. 1, G indicates the center of gravity position of the robot 2.

The control unit 10 is a computer device that includes CPU, ROM, RAM, hard disk and so on. The control unit 10 can communicate with the controller 12 and receives a command value from the controller 12 that is manipulated by a user. The control unit 10 generates or calculates the motion pattern of the robot 2 based on the command value that is input by a user. The control unit 10 stores the generated motion pattern and drives each joint so as to implement the stored motion pattern. The detail of the control unit 10 is described later.

In the following description, a coordinate system (x, y, z) that is fixed to the floor outside the robot 2 is used as a coordinate system for describing the trajectory of the robot 2. A coordinate system that is fixed at the reference point on the robot 2 is expressed as (x', y', z'). In the robot 2 according to the first embodiment, the center of the foot of the support leg is the reference point with the coordinate system (x', y', z') as shown in FIG. 1. In the followings, a position, a velocity, an acceleration and a trajectory that are described in the coordinate system (x', y', z') that is fixed at the reference point of the robot 2 are referred to as a relative position, a relative velocity, a relative acceleration and a relative trajectory, respectively.

The robot 2 according to the first embodiment generates and stores the motion pattern from the start to the end of motion, and implements the motion by sequentially reading the stored motion pattern. If a command value is input by a user when the robot 2 is in motion, the robot 2 regenerates the subsequent motion pattern and stores the motion pattern according to the newly input command value. The stored new motion pattern is used for the subsequent motion. In this manner, the robot 2 according to the first embodiment walks by generating the motion pattern in real time.

The detail of the operation of the control unit 10 is described hereinbelow. FIG. 2 is a functional block diagram showing the configuration of the functions of the control unit 10. The control unit 10 includes a user command storing section 302, a relative center-of-gravity trajectory planning section 304, a relative swing leg trajectory planning section 306, a joint angle target value computing section 308 and a joint driving section 310. The terms "calculation", "generation" and "computation" are used with no distinction because the trajectory of the center of gravity is calculated and generated.

The user command storing section 302 stores a user command value 360 that is input by a user. The user command storing section 302 stores data such as (1) a motion duration 320 from the start to the end of motion, (2) a relative ZMP trajectory 322 from the start to the end of motion, (3) a horizontal center-of-gravity velocity 324 at the start and the end of motion, (4) swing leg tip position and velocity 326 at the start and the end of motion and so on. The detail of those data is described later.

If the new user command value 360 is input when the robot 2 is in motion, the control unit 10 rewrites the user command value that is stored in the user command storing section 302 into the newly input user command value. Because the control unit 10 sequentially calculates and generates the motion based on the data that is stored in the user command storing section 302, the new command value that is input by a user is used for generation of the subsequent motion of the robot 2. A user inputs the user command value using the controller 12 such as a joystick while viewing the movement of the robot 2, thereby controlling the motion of the robot 2 in real time.

The relative center-of-gravity trajectory planning section 304 generates the trajectory of the center of gravity of the robot 2 based on the user command value stored in the user command storing section 302 and the angular momentum according to the velocity of the center of gravity. Although the trajectory of the center of gravity generated therein is described in the coordinate system (x, y, z) that is fixed outside of the robot 2, because the reference point (located at the foot of the support leg) of the robot 2 does not shift with respect to the floor in the ground phase where the robot 2 is on the ground, it may be treated as data described in the coordinate system (x', y', z') that is fixed at the reference point of the robot 2. The detail of the trajectory generation processing is described later.

In the trajectory generation processing by the robot 2 according to the first embodiment, the angular momentum is specified using the mass of the robot 2, the proportionality constant related to the angular momentum and the velocity of the center of gravity. The proportionality constant related to the angular momentum is referred to as an angular momentum parameter 370.

Figure 3B:
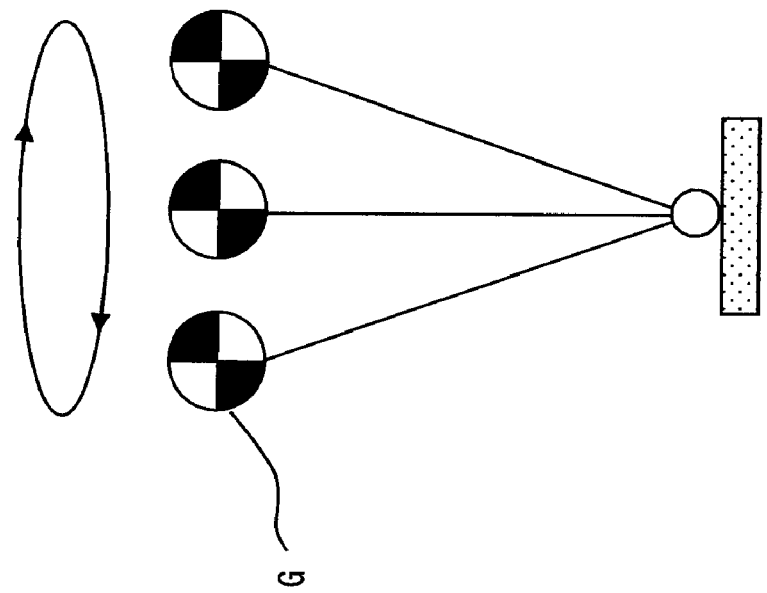
FIGS. 3A and 3B are views showing the inertia model of the legged robot according to a first embodiment of the present invention and a legged robot according to a related art, respectively.
Figure 3A:
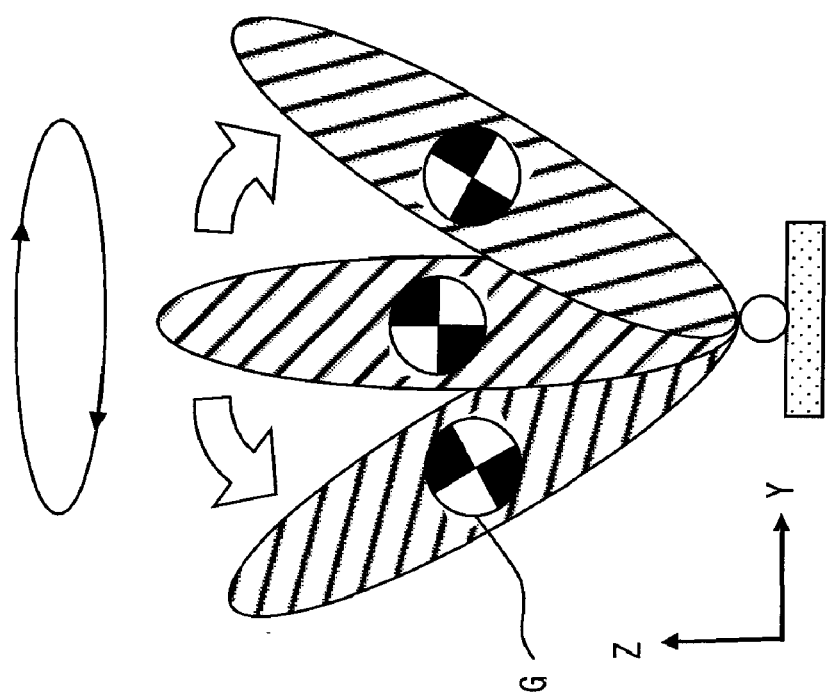

Referring to FIG. 3A, in the robot 2 according to the first embodiment, the inertia model that is configured by a material with a homogeneous spread, where the center of gravity G is located at the position shown in FIG. 3A, is assumed. In such an inertia model, when the position of the center of gravity shifts from side to side, the angular momentum is generated according to the motion. Referring, in contrast, to FIG. 3B, the related arts assume the single-mass-point model where the mass is concentrated on a single point with no consideration of an inertial force, so that the center of gravity shifts with regard to the mass, in disregard of the angular momentum.

In the inertia model shown in FIG. 3A, at every shift of the center of gravity, the posture changes and rotates. Specifically, an inertial force is generated in proportion to the velocity of the center of gravity, so that the rotational momentum is generated. Accordingly, with the assumption of such an inertia model, the rotational momentum can be defined by the term that is proportional to the velocity of the center of gravity. This is based on the idea that the upper body rotation of the robot 2 would generate the angular momentum that is proportional to the rotation speed.

In the robot 2 according to the first embodiment, the robot 2 as a whole is regarded as a large rigid body, and the relative trajectory of the center of gravity is generated based on the inertia model that involves the moment of inertia (constant value) about the roll axis (x' axis) and the pitch axis (y' axis). The angular momentum about the yaw axis (z' axis) can be set so that the robot 2 implements desired cornering motion. In the robot 2 according to the first embodiment, the angular momentum about the yaw axis is set to 0. The detail of the angular momentum parameter 370 is described in detail later.

The relative center-of-gravity trajectory 330 is the trajectory of the center of gravity described in the coordinate system (x', y', z') whose origin is the reference point at the tip of the support leg of the robot 2. In the relative center-of-gravity trajectory 330, the symbol indicating the sequence of the time interval from the start to the end of the motion of the robot 2 is associated with the relative trajectory of the center of gravity in the relevant time interval. The relative center-of-gravity trajectory 330 is updated each time the relative trajectory of the center of gravity in a given time interval is calculated by the relative center-of-gravity trajectory planning section 304.

The relative swing leg trajectory planning section 306 calculates the relative trajectory 340 of the tip of the swing leg of the robot 2 based on the relative center-of-gravity trajectory 330 of the robot 2 that is calculated by the relative center-of-gravity trajectory planning section 304 and the user command value that is stored in the user command storing section 302. The relative trajectory 340 of the tip of the swing leg calculated therein is described in the coordinate system (x', y', z') whose origin is the reference point at the tip of the support leg of the robot 2.

The relative swing leg trajectory 340 is data that describes the relative trajectory of the reference point at the tip of the swing leg of the robot 2 in each time interval, in which the symbol indicating the sequence of the time interval is associated with the relative trajectory of the reference point at the tip of the swing leg in the relevant time interval. The relative swing leg trajectory 340 is updated each time the relative trajectory of the swing leg in a given time interval is calculated by the relative swing leg trajectory planning section 306.

The joint angle target value computing section 308 computes the time-varying data 350 of a joint angle target value for each joint of the robot 2 based on the relative trajectory 330 of the center of gravity of the robot 2 that is calculated by the relative center-of-gravity trajectory planning section 304 and the relative trajectory 340 of the reference point at the tip of the swing leg of the robot 2 that is calculated by the relative swing leg trajectory planning section 306.

The joint angle target value time-varying data 350 includes time-varying data of a target joint angle for each joint of the robot 2. The joint driving section 310 drives each joint of the robot 2 based on the joint angle target value time-varying data 350.

Figure 4:
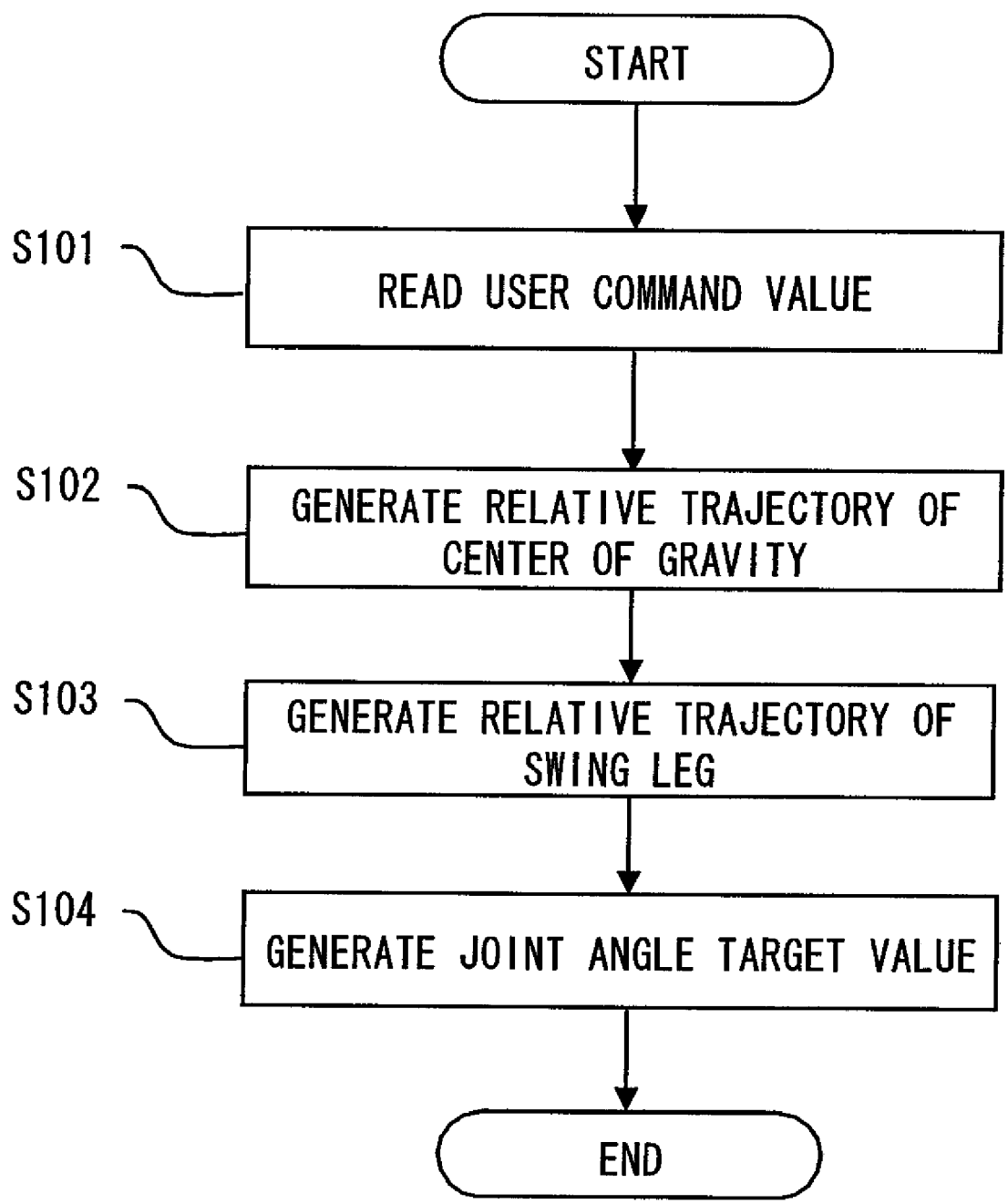
FIG. 4 is a flowchart showing the processing performed by the control unit of the legged robot according to the first embodiment of the present invention.

The processing that is performed by the robot 2 according to the first embodiment is described hereinafter with reference to FIG. 4. FIG. 4 is a flowchart to describe motion generation processing. Although the processing of FIG. 4 can deal with arbitrary walking and running motion, the processing deals with stepping walking motion in the following description by way of illustration.

First, in Step S101, the control unit 10 reads the user command value related to the motion to be generated from the user command storing section 302. As the user command value, the parameters (1) the motion duration 320 from the start to the end of motion, (2) the relative ZMP trajectory 322 from the start to the end of motion, (3) the horizontal center-of-gravity velocity 324 at the start and the end of motion, (4) the swing leg tip position and velocity 326 at the start and the end of motion may be given.

The motion duration 320 from the start to the end of motion is a time period from the start to the end of the motion of the robot 2, which may be arbitrarily given by a user.

The relative ZMP trajectory 322 from the start to the end of motion is time-varying data of the position with respect to the reference point of the foot of the support leg of a target ZMP, which may be arbitrarily given by a user. In the ground phase, if a ZMP exists within the foot of the leg link serving as the support leg, the robot 2 can continue its motion without falling down. In the robot 2 according to the first embodiment, the relative ZMP trajectory is set so that it is fixed at the center of the foot of the support leg. If such a relative ZMP trajectory is realized, the robot 2 can implement the motion stably without falling down. The relative ZMP trajectory may be any trajectory as long as it is kept within the foot. For example, the trajectory that moves from backward to forward within the foot of the support leg may be used. The robot 2 can implement the motion stably without falling down when such a relative ZMP trajectory is realized as well.

The horizontal center-of-gravity velocity 324 at the start and the end of motion is the horizontal velocity to be achieved by the center of gravity of the robot 2 at the start and the end of the motion of the robot 2, and it may be arbitrarily given by a user within the range permitted by the performance of the actuator of the robot 2.

The swing leg tip position and velocity 326 at the start and the end of motion is the position and the velocity of the swing leg tip viewed from the support leg tip at the start and the end of the motion of the robot 2, and it may be arbitrarily given by a user within the range geometrically permitted by the mechanism of the robot 2.

In Step S102, the relative trajectory of the center of gravity is calculated. The relative trajectory of the center of gravity is determined based on the conditions of the target relative ZMP trajectory, the angular momentum parameter and the horizontal velocity of the center of gravity at the start and the end of motion. In Step S102, the relative trajectory of the center of gravity is calculated so that the actual relative ZMP trajectory when the relative trajectory of the center of gravity is realized coincides with the target relative ZMP trajectory.

The angular momentum parameter 370 is set to the relative center-of-gravity trajectory planning section 304. An appropriate value is set as the angular momentum parameter 370 so as to generate a suitable trajectory by performing a predetermined experiment or simulation in advance. In the experiment, a trajectory is generated by varying the angular momentum parameter 370 and the robot 2 is put into motion based on the generated trajectory, thereby determining the value that enables the natural motion.

The target relative ZMP trajectory and the horizontal velocity of the center of gravity at the start and the end of motion are given by the user command value in Step S101. In Step S102, the relative trajectory of the center of gravity is calculated so as to satisfy those conditions.

The calculation of the relative trajectory of the center of gravity is described hereinbelow. The relative ZMP position $(q_{x'}, q_{y'})$ that is realized by the robot 2 can be calculated from the relative center-of-gravity position $(x', y', z')$ of the robot 2 and the angular momentum $(r_{x'}, r_{y'})$ about the center of gravity of the robot 2. The following expression that calculates the actually generated ZMP from the relative center-of-gravity position of the robot 2 and the angular momentum about the center of gravity of the robot 2 is called the ZMP equation.

$$q_{x'} = \frac{m(z'^{(2)} + g)x' - mx'^{(2)}z' - r_{y'}^{(1)}}{m(z'^{(2)} + g)}$$

$$q_{y'} = \frac{m(z'^{(2)} + g)y' - my'^{(2)}z' + r_{x'}^{(1)}}{m(z'^{(2)} + g)}$$

[Expression 1]

In the above expression, $^{(1)}$ indicates first-order differentiation with respect to time t, and $^{(2)}$ indicates second-order differentiation with respect to time t. Further, m indicates the mass of the robot 2, and g indicates the gravitational acceleration. In the above expression, $z'$ and $z'^{(2)}$ are the vertical position and the vertical acceleration of the center of gravity with respect to the origin at the tip of the support leg of the robot. In the motion of the robot 2 according to the first embodiment, $z'$ is set to a fixed value and $z'^{(2)}$ is set to 0, assuming that the height of the center of gravity is constant and the mass does not change in the z' direction. In the above expression, $r_{x'}^{(1)}$ and $r_{y'}^{(1)}$ indicate differential elements of the angular momentum about the center of gravity.

The technique according to the related art treats the angular momentum $(r_{x'}, r_{y'})$ as 0 throughout the motion and, when the vertical trajectory z' of the center of gravity is given, it discretizes the above-described Expression 1 and applies boundary condition, thereby obtaining a solution as simultaneous equations. The technique further sets the vertical acceleration $z'^{(2)}$ of the center of gravity to 0, thereby obtaining an analytic solution of the ZMP equations in the above-described Expression 1.

In the robot 2 according to the first embodiment, the term that is proportional to the velocity of the center of gravity is used, instead of setting the angular momentum $r_{x'}$ and $r_{y'}$ about the roll axis (x' axis) and the pitch axis (y' axis) to 0, in every time interval from the start to the end of the motion. Specifically, the angular momentum $r_{x'}$ and $r_{y'}$ are defined by the following expression:

$$r_{x'} = -mh_{y'}y'^{(1)} + \alpha_{y'}$$

$$r_{x'}^{(1)} = -mh_{y'}y'^{(2)}$$

$$r_{y'} = mh_{x'}x'^{(1)} + \alpha_{x'}$$

$$r_{y'}^{(1)} = mh_{x'}x'^{(2)}$$

[Expression 2]

In the above expression, $h_{x'}$ is a proportionality constant related to the center-of-gravity velocity $x'^{(1)}$, and $\alpha_{x'}$ is a constant. Likewise, $h_{y'}$ is a proportionality constant related to the center-of-gravity velocity $y'^{(1)}$, and $\alpha_{y'}$ is a constant. The proportionality constants $h_{x'}$ and $h_{y'}$ are the angular momentum parameters. The expression for specifying the angular momentum is not limited thereto, and the following expression that includes the term of time t may be used, for example. The $r_{x'}$ and $r_{y'}$ that are thereby specified indicate the variation of the angular momentum over time. $\beta_{x'}$ and $\beta_{y'}$ are constants.

$$r_{x'} = -mh_{y'}y'^{(1)} + \alpha_{y'}t + \beta_{y'}$$

$$r_{y'} = mh_{x'}x'^{(1)} + \alpha_{x'}t + \beta_{x'}$$

[Expression 3]

Substituting the angular momentum shown in the above Expression 2 into the ZMP equations of the above Expression 1 yields the following equation:

$$q_{x'} = \frac{m(z'^{(2)} + g)x' - mx'^{(2)}z' - mh_{x'}x'^{(2)}}{m(z'^{(2)} + g)}$$

$$q_{y'} = \frac{m(z'^{(2)} + g)y' - my'^{(2)}z' - mh_{y'}y'^{(2)}}{m(z'^{(2)} + g)}$$

[Expression 4]

Discretizing the ZMP equation of Expression 4 derives the expression for obtaining the time-varying data of the horizontal center-of-gravity position $(x', y')$. The discretization is performed using the unit time $\Delta t$ with respect to the time t. For example, for the x'-direction trajectory of the center of gravity, the following trinomial equation is obtained.

$$q_{x'i} = a_i x'_{i-1} + b_i x'_i + c_i x'_{i+1}$$

[Expression 5]

In the above expression, $x'_i$ and $q_{x'i}$ are variables obtained by discretizing the x'-direction center-of-gravity trajectory x'(t) and the relative x'-direction ZMP trajectory $q_{x'}(t)$, respectively. Further, i indicates the sequence of time divided by unit time. The above Expression 5 shows that the x' direction coordinate $q_{x'i}$ of the ZMP at the time i can be calculated from the immediately preceding x' direction coordinate $x'_{i-1}$, the x' direction coordinate $x'_i$ at that time and the immediately following x' direction coordinate $x'_{i+1}$. The coefficients $a_i$, $b_i$ and $c_i$ are coefficients that are calculated by the following expression:

$$a_i = c_i = -\frac{z'_i + h}{b_i = 1 - 2a_i(z'^{(2)}_i + g)\Delta t^2}$$ [Expression 6]

As described earlier, as the angular momentum parameter h, an appropriate value that enables generation of a suitable trajectory is determined by performing a predetermined experiment or simulation in advance. If the angular momentum parameter h is set to 0, the robot 2 performs motion in the unnatural posture just like the related art. By gradually increasing the angular momentum parameter h, the robot 2 performs motion with the upper body keeping the straight posture without rotating. By further increasing the angular momentum parameter h, the robot 2 performs motion with the upper body keeping the straight posture, swinging from side to side. In this manner, the state of the upper body is observed with the value gradually changing, and the value that allows maintaining the most suitable posture is determined. Thus, an appropriate value for the parameter h is determined by observing the motion of the robot 2.

In the above expression, $\Delta t$ indicates a time width used for discretization of the ZMP equation, and $z'_i$ and $z'^{(2)}_i$ are variables obtained by discretizing the vertical position and the acceleration of the center of gravity, respectively. In this embodiment, $\Delta t$ is a time width obtained by dividing the time from the start to the end of motion into n equal parts.

The on-the-spot stepping motion of the robot 2 begins with an upright posture, then lifts the right leg once and lets it down to the floor keeping a balance, further lifts the left leg once and then lets it down to the floor keeping a balance, and finally returns to the upright posture. In other words, it is the motion that drives the legs of the robot 2 alternately from the upright posture, thereby supporting the center of gravity. With regard to the on-the-spot stepping motion, which is such a periodic motion, the relative trajectory of the center of gravity for implementing the motion can be determined uniquely. Specifically, by adding periodic boundary condition for performing periodic motion (the condition that the center of gravity position of the robot 2 is circulated at the start and the end of the motion), a unique relative center-of-gravity trajectory for implementing the on-the-spot stepping motion can be obtained.

Summarizing the above-described relationship, eventually, the x'-direction center-of-gravity trajectory $(x'_1, x'_2, \ldots, x'_n)$, by which the realized relative ZMP trajectory coincides with the target relative ZMP trajectory, can be obtained by solving the equation represented by the following matrix. Under the periodic boundary condition, the following matrix can be formed by a circulant matrix in which the periodic boundary condition is applied to a tridiagonal matrix.

$$\begin{bmatrix} b_1 & c_1 & 0 & 0 & & & 0 & a_1 \\ a_2 & b_2 & c_2 & 0 & & & 0 & 0 \\ 0 & a_3 & b_3 & c_3 & & & & \\ & & & \ddots & & & & \\ & & & & \ddots & & & \\ & & & & a_{n-2} & b_{n-2} & c_{n-2} & 0 \\ 0 & 0 & & 0 & a_{n-1} & b_{n-1} & c_{n-1} \\ c_n & 0 & & 0 & 0 & a_n & b_n \end{bmatrix} \begin{bmatrix} x'_1 \\ x'_2 \\ x'_3 \\ \vdots \\ \vdots \\ x'_{n-2} \\ x'_{n-1} \\ x'_n \end{bmatrix} = \begin{bmatrix} q_{x'1} \\ q_{x'2} \\ q_{x'3} \\ \vdots \\ \vdots \\ q_{x'n-2} \\ q_{x'n-1} \\ q_{x'n} \end{bmatrix}$$ [Expression 7]

In the above Expression 7, the left side is expressed by the product of a matrix and a column vector, and the matrix contains a coefficient calculated by the vertical element and the angular momentum parameter h. In the stepping motion of the robot 2 according to the first embodiment, the matrix is a circulant matrix in which the periodic boundary condition is applied to the tridiagonal matrix. The periodic boundary condition is condition in which the center of gravity position of the robot 2 is circulated at the start and the end of the motion by setting the n-th column in the first row to a coefficient $a_1$, and the first column in then-th row to a coefficient $c_n$. The tridiagonal matrix is a matrix in which the diagonal elements and the subdiagonal elements adjacent thereto have significant values, and the other elements are 0. In other words, under the periodic boundary condition, with regard to the simultaneous equations represented by the above Expression 7, the elements of the coefficient matrix are arranged so that the equation related to the first element in the column of target ZMP contains the last element in the column of trajectory of the center of gravity, and the equation related to the last element in the column of target ZMP contains the first element in the column of trajectory of the center of gravity. The column vector on the left side indicates the x'-direction trajectory $(x'_1, x'_2, \ldots, x'_n)$ of the center of gravity. The column vector on the right side indicates the target relative ZMP trajectory.

In the above Expression 7, unknowns $(x'_1, x'_2, \ldots, x'_n)$ can be obtained by calculating the inverse matrix of the circulant matrix on the left side and further calculating the product of the inverse matrix and the right side. The x'-direction trajectory of the center of gravity can be thereby obtained. With the above-described calculations, it is possible to directly calculate the relative trajectory of the center of gravity that satisfies the target relative ZMP trajectory without the need to calculate the relative trajectory of the center of gravity by trial and error. The above-described calculations can be made with a small amount of calculations, so that the relative center-of-gravity trajectory planning section 304 can perform calculations at high speed. In the case of setting the discretization number related to the trajectory of the center of gravity to n, the amount of calculations is O(n), and it is possible to obtain a solution at very high speed. In Step S102, the relative trajectory of the center of gravity is calculated in such a way that the actual relative ZMP trajectory when realizing the relative trajectory of the center of gravity coincides with the target relative ZMP trajectory.

The y'-direction trajectory $(y'_1, y'_2, \ldots, y'_n)$ of the center of gravity can be calculated from the relative y'-direction ZMP position $(q_{y'1}, q_{y'2}, \ldots, q_{y'n})$, the angular momentum parameter h, and the horizontal velocity of the center of gravity at the start and the end of motion, just like the x'-direction trajectory $(x'_1, x'_2, \ldots, x'_n)$ of the center of gravity.

By performing the processing of Step S102, it is possible to generate the trajectory of the center of gravity. By realizing the trajectory of the center of gravity that is generated by the processing, the robot 2 can implement the on-the-spot stepping motion with the ZMP maintained within the foot of the support leg.

In Step S103, the relative trajectory of the tip of the swing leg is calculated. The relative trajectory of the tip of the swing leg is calculated so as to ensure smooth continuation with the motion of the leg link before and after the stepping motion.

The relative position and the velocity of the tip of the swing leg at the start and the end of the stepping motion are given as the user command value. The relative trajectory of the tip of the swing leg in the stepping motion period may be calculated using polynomial interpolation, for example.

In Step S104, a target value of the joint angle that realizes the relative trajectories of the center of gravity and the swing leg that are calculated by the above-described processing is calculated. The joint angle target value can be calculated by means of inverse kinematics. The relative translational momentum $P_g$ of the robot 2, the relative angular momentum $L_g$ of the robot 2, the relative velocity $v_f$ of the swing leg tip, and the angular velocity $\omega_f$ of the swing leg tip are expressed as follows using the angular velocity $\theta^{(1)}$ of the joint angle and the Jacobian matrix $J_g(\theta)$, $K_g(\theta)$, $J_f(\theta)$ and $K_f(\theta)$, respectively.

$$P_g = J_g \theta^{(1)}$$

$$L_g = K_g \theta^{(1)}$$

$$v_f = J_f \theta^{(1)}$$

$$\omega_f = K_f \theta^{(1)} \qquad \text{[Expression 8]}$$

In the above Expression 8, the angular velocity $\theta^1$ is obtained by first-order differentiating the angle $\theta$ of the joint angle with respect to time. The angle $\theta$ of the joint angle is a set of joint angles $(\theta_1, \theta_2, \ldots, \theta_{n-1})$ of the robot as follows.

$$\theta = \begin{bmatrix} \theta_1 \\ \theta_2 \\ \vdots \\ \theta_{n-2} \\ \theta_{n-1} \end{bmatrix} \qquad \text{[Expression 9]}$$

The relative translational momentum $P_g$ of the robot 2, the relative angular momentum $L_g$ of the robot 2, the relative velocity $v_f$ of the swing leg tip, and the angular velocity $\omega_f$ the swing leg tip are as follows.

$$P_g = \begin{bmatrix} mx_g^{(1)} \\ my_g^{(1)} \\ mz_g^{(1)} \end{bmatrix} \qquad \text{[Expression 10]}$$

$$L_g = \begin{bmatrix} I\theta_{gx}^{(1)} \\ I\theta_{gy}^{(1)} \\ I\theta_{gz}^{(1)} \end{bmatrix}$$

$$v_f = \begin{bmatrix} x_f^{(1)} \\ y_f^{(1)} \\ z_f^{(1)} \end{bmatrix}$$

$$\omega_f = \begin{bmatrix} \theta_{xf}^{(1)} \\ \theta_{yf}^{(1)} \\ \theta_{zf}^{(1)} \end{bmatrix}$$

The number of the Jacobian matrixes of the swing leg tip equals the number of the swing legs. The robot 2 according to the first embodiment has two leg links, and the joint angle target value is computed by counting the swing leg as one leg link. The angular velocity $\theta^{(1)}$ that satisfies the target robot motion $P_g$, $L_g$, $v_f$ and $\omega_f$ is a redundant system having an infinite number of solutions. In the robot 2 according to the first embodiment, the time-varying data of the target joint angle is computed on the conditions of achieving the target relative velocity of the center of gravity as a first subtask, achieving the target angular momentum as a second subtask and achieving the target relative trajectory of the swing leg tip as a third subtask. The technique of obtaining an optimum solution within an allowable range of redundancy for the constraint conditions represented by the plurality of Jacobian matrixes as described above by setting priorities to the respective conditions has been proposed and thus not described here.

By performing the above-described processing, the target value of the joint angle can be computed under the constraint conditions of the trajectory of the center of gravity, the target angular momentum, and the trajectory of the swing leg tip. The stable motion pattern of the robot 2 can be thereby generated. Such a technique enables generation of the motion pattern using all the degrees of freedom of the robot such as the legs, the arms and the body, thereby creating more natural and flexible motion pattern.

The time-varying data 350 of the joint angle target value that is computed in Step S104 is stored in the control unit 10. After Step S104, the process returns to Step S101 and performs the processing from Step S101 to Step S104 repeatedly.

In parallel with the processing of FIG. 4 described above, the control unit 10 sequentially drives the joints of the robot 2 by the joint driving section 310 based on the joint angle target value time-varying data 350. The robot 2 thereby implements the stable motion based on the user command value.

As described in the foregoing, in the robot 2 according to the first embodiment, the angular momentum is specified using the term that is proportional to the velocity of the center of gravity, and the relative trajectory of the center of gravity is generated based on the angular momentum. Because the angular momentum is proportional to the shift velocity of the center of gravity, rather than 0, if the center of gravity shifts to the left, for example, the upper body also rotates to the left in proportion to the shift of the center of gravity. This prevents the motion of the robot 2 based on the generated trajectory from being unnatural.

Figure 5B:
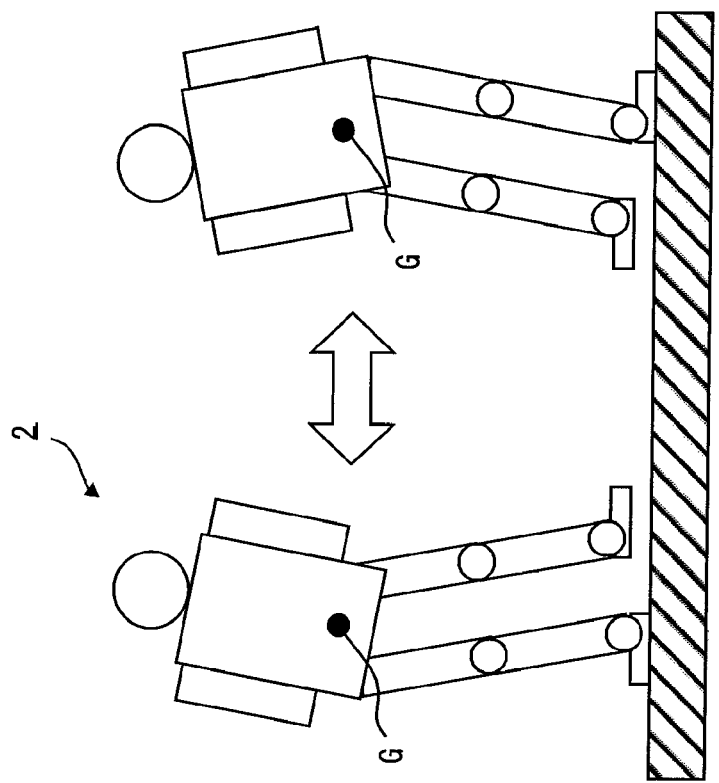
FIGS. 5A and 5B are views showing the outline of the motion of the legged robot according to the first embodiment of the present invention and a legged robot according to a related art, respectively.
Figure 5A:
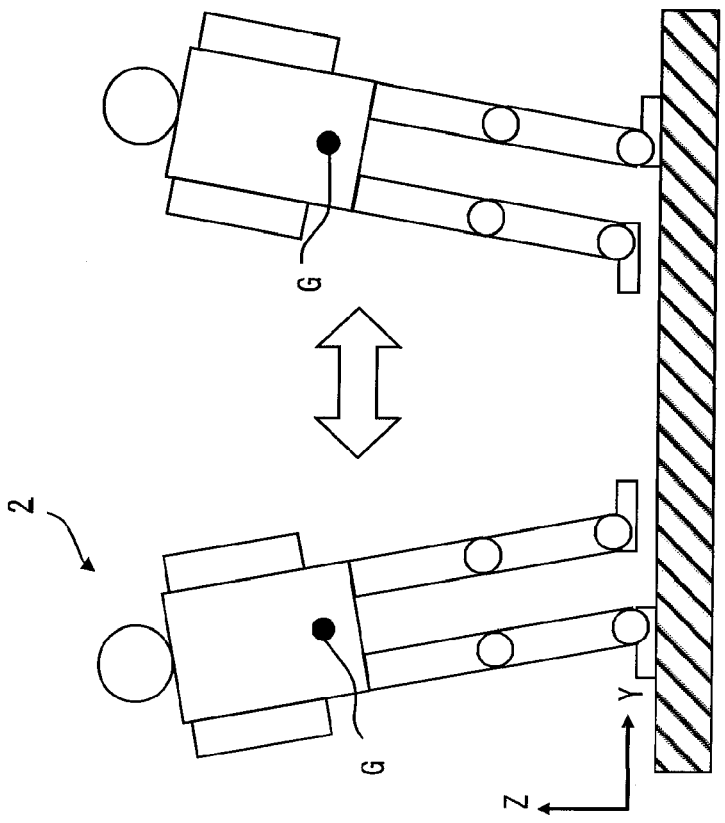

It is thereby possible to prevent the unnatural side-to-side rotation of the upper body during the on-the-spot stepping motion, thereby implementing the natural motion as shown in FIG. 5A. Besides during the stepping motion, it is possible to prevent the unnatural back-and-forth rotation, in addition to the side-to-side rotation, of the upper body during the walking motion, for example, so that the robot can perform motion in a natural posture.

Second Embodiment

In the first embodiment, the processing of generating the relative trajectory of the center of gravity for implementing given motion is described with regard to the case where the robot 2 performs the on-the-spot stepping motion. The present invention, however, is not limited thereto, and besides the periodic motion such as the on-the-spot stepping motion, it is possible to generate the relative trajectory of the center of gravity for implementing given motion under velocity boundary condition. The structure and the trajectory generation processing of the robot 2 according to a second embodiment of the present invention are the same as those of the first embodiment described above except that it calculates the relative trajectory of the center of gravity under the velocity boundary condition.

The trajectory generation processing in the case where the robot 2 performs the walking motion is described hereinbelow. In the robot 2 according to the second embodiment, the motion of the robot 2 is calculated in such a way that the trajectory of the center of gravity changes smoothly at the start and the end of the walking motion. By calculating the motion in this way, the center of gravity position of the robot 2 makes smooth transition even when the robot 2 changes the support leg, so that the robot 2 achieves the stable motion. The x'-direction velocity $v_{x'1}$ of the center of gravity at the start of the walking motion is represented by the following expression using the divided time width $\Delta t$ and the positions $x'_1$ and $x'_2$ of the center of gravity.

$$v_{x'1} \Delta t = x'_2 - x'_1 \quad [\text{Expression 11}]$$

Likewise, the x'-direction velocity $v_{x'n}$ of the center of gravity at the end of the walking motion has the following relationship with the divided time width $\Delta t$ and the positions $x'_{n-1}$ and $x'_n$ of the center of gravity.

$$v_{x'n} \Delta t = x'_n - x'_{n-1} \quad [\text{Expression 12}]$$

The x'-direction velocities $v_{x'1}$ and $v_{x'n}$ of the center of gravity at the start and the end of the walking motion are set as the user command value in Step S101 according to the first embodiment described above.

Summarizing the above-described relationship, eventually, the x'-direction trajectory $(x'_1, x'_2, \ldots, x'_n)$ of the center of gravity in the walking motion, by which the realized relative ZMP trajectory coincides with the target relative ZMP trajectory, can be obtained by solving the equation represented by the following tridiagonal matrix.

[Expression 13]

$$\begin{bmatrix} -1 & 1 & 0 & 0 & & & & \\ a_2 & b_2 & c_2 & 0 & & & 0 & \\ 0 & a_3 & b_3 & c_3 & & & & \\ & & \ddots & & & & & \\ & & & \ddots & & & & \\ 0 & & & & a_{n-2} & b_{n-2} & c_{n-2} & 0 \\ & & & & 0 & a_{n-1} & b_{n-1} & c_{n-1} \\ & & & & 0 & 0 & -1 & 1 \end{bmatrix} \begin{bmatrix} x'_1 \\ x'_2 \\ x'_3 \\ \vdots \\ \vdots \\ x'_{n-2} \\ x'_{n-1} \\ x'_n \end{bmatrix} = \begin{bmatrix} v_{x'1}\Delta t \\ p_{x'2} \\ p_{x'3} \\ \vdots \\ \vdots \\ p_{x'n-2} \\ p_{x'n-1} \\ v_{x'n}\Delta t \end{bmatrix}$$

In the above Expression 13, the left side is expressed by the product of a matrix and a column vector, and the matrix is a tridiagonal matrix that contains a coefficient calculated by the vertical trajectory. The tridiagonal matrix is a matrix in which the diagonal elements and the subdiagonal elements adjacent thereto have significant values, and the other elements are 0. The column vector on the left side indicates the x'-direction trajectory $(x'_1, x'_2, \ldots, x'_n)$ of the center of gravity. The column vector on the right side involves the target relative ZMP trajectory, the value $v_{x'1}\Delta t$ that is obtained by multiplying the unit time $\Delta t$ by the x'-direction velocity $v_{x'1}$ of the center of gravity at the start to convert it into a distance, and the value $v_{x'n}\Delta t$ that is obtained by multiplying the unit time $\Delta t$ by the x'-direction velocity $v_{x'n}$ of the center of gravity at the end to convert it into a distance.

In the above Expression 13, unknowns $(x'_1, x'_2, \ldots, x'_n)$ can be obtained by calculating the inverse matrix of the tridiagonal matrix on the left side and further calculating the product of the inverse matrix and the right side. In the above-described calculations, it is possible to directly calculate the relative trajectory of the center of gravity that satisfies the target relative ZMP trajectory without the need to calculate the relative trajectory of the center of gravity by trial and error. The above-described calculations can be made with a small amount of calculations, so that the relative center-of-gravity trajectory planning section 304 can perform calculations at high speed.

The y'-direction trajectory $(y'_1, y'_2, \ldots, y'_n)$ of the center of gravity can be calculated from the relative y'-direction ZMP position $(q_{y'1}, q_{y'2}, \ldots, q_{y'n})$, the angular momentum parameter h, and the velocities $v_{y'1}$ and $v_{y'n}$ at the start and the end of the walking motion, just like the x'-direction trajectory $(x'_1, x'_2, \ldots, x'_n)$ of the center of gravity.

Instead of the horizontal velocities $v_{x'1}$ and $v_{y'1}$ described above, horizontal unit vectors $n_{x'}$ and $n_{y'}$ indicating the shifting direction of the center of gravity and the velocity absolute value $|v|$ may be given as the command value by a user. In such a case, the horizontal velocities $v_{x'1}$ and $v_{y'1}$ are calculated by the following expression.

$$v_{x'1} = |v| \cdot n_{x'}$$

$$v_{y'1} = |v| \cdot n_{y'} \quad [\text{Expression 14}]$$

In this way, it is possible to generate the trajectory of the center of gravity in the walking motion of the robot 2. By realizing the trajectory of the center of gravity that is generated by the above-described processing, the robot 2 can implement the walking motion with the ZMP maintained within the foot of the support leg.

Other Embodiment

In the first and second embodiments described above, an appropriate value is determined as the angular momentum parameter h so as to generate a suitable trajectory by performing a predetermined experiment or simulation in advance; however, the present invention is not limited thereto. For example, the value of the angular momentum parameter h may be calculated automatically according to the motion of the robot 2. The angular momentum parameter h may be determined by detecting the posture angle of the body or the waist of the robot 2 using a gyrosensor (not shown), for example, and based on a change in the posture of the robot 2 and the moment of inertia of the robot 2. By determining the angular momentum parameter h according to the actual motion of the robot 2, it is possible to easily calculate a value that ensures more natural motion for a various kinds of the robot 2 having different structures.

Although the above embodiments describe the legged robot having two leg links by way of illustration, the present invention may be applied to the legged robot having three or more leg links or to the legged robot having a single leg link.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A legged robot that performs motion by changing a joint angle, the robot including a control unit comprising:
    a section of generating a center-of-gravity trajectory of the legged robot based on a trinomial equation obtained by discretizing a ZMP equation and a target ZMP;
    a section of calculating time-varying data of a target value of the joint angle based on the generated center-of-gravity trajectory; and
    a section of rotating a joint of the legged robot based on the calculated time-varying data of a target value of the joint angle,
    wherein an angular momentum involved in the ZMP equation is specified by using a linear expression containing a center-of-gravity velocity as a variable.

2. The legged robot according to claim 1, wherein the angular momentum is specified using a mass of the legged robot, a proportionality constant h related to the angular momentum, and the center-of-gravity velocity, and the proportionality constant h is calculated based on a change in posture of the legged robot.

3. The legged robot according to claim 1, wherein the section of generating a center-of-gravity trajectory calculates the center-of-gravity trajectory by solving simultaneous equations established among a matrix containing a coefficient calculated based on a vertical trajectory of a center of gravity and the angular momentum, a column of center-of-gravity trajectory and a column of target ZMP.

4. The legged robot according to claim 3, wherein the matrix is a matrix containing the coefficient calculated based on the vertical trajectory and the angular momentum so that an equation related to a first element in the column of target ZMP involves a last element in the column of center-of-gravity trajectory, and an equation related to a last element in the column of target ZMP involves a first element in the column of center-of-gravity trajectory.

5. The legged robot according to one of claims 1, wherein the section of generating a center-of-gravity trajectory calculates the center-of-gravity trajectory by solving simultaneous equations established among a tridiagonal matrix containing a coefficient calculated based on a vertical trajectory of a center of gravity and the angular momentum, a column of center-of-gravity trajectory, and a column of distance calculated from a target ZMP and a horizontal center-of-gravity velocity at start and end of motion.

6. A control method of a legged robot that performs motion by changing a joint angle, comprising:
 generating a center-of-gravity trajectory of the legged robot based on a trinomial equation obtained by discretizing a ZMP equation and a target ZMP;
 calculating time-varying data of a target value of the joint angle based on the generated center-of-gravity trajectory; and
 rotating a joint of the legged robot based on the calculated time-varying data of a target value of the joint angle,
 wherein the ZMP equation involves an angular momentum according to a center-of-gravity velocity of the legged robot.

* * * * *